Oct. 16, 1956    R. C. ALDERSON    2,766,952
AIRCRAFT CONTROL APPARATUS
Filed Dec. 1, 1951    2 Sheets-Sheet 1

INVENTOR.
ROSS C. ALDERSON
BY George H Fisher
ATTORNEY

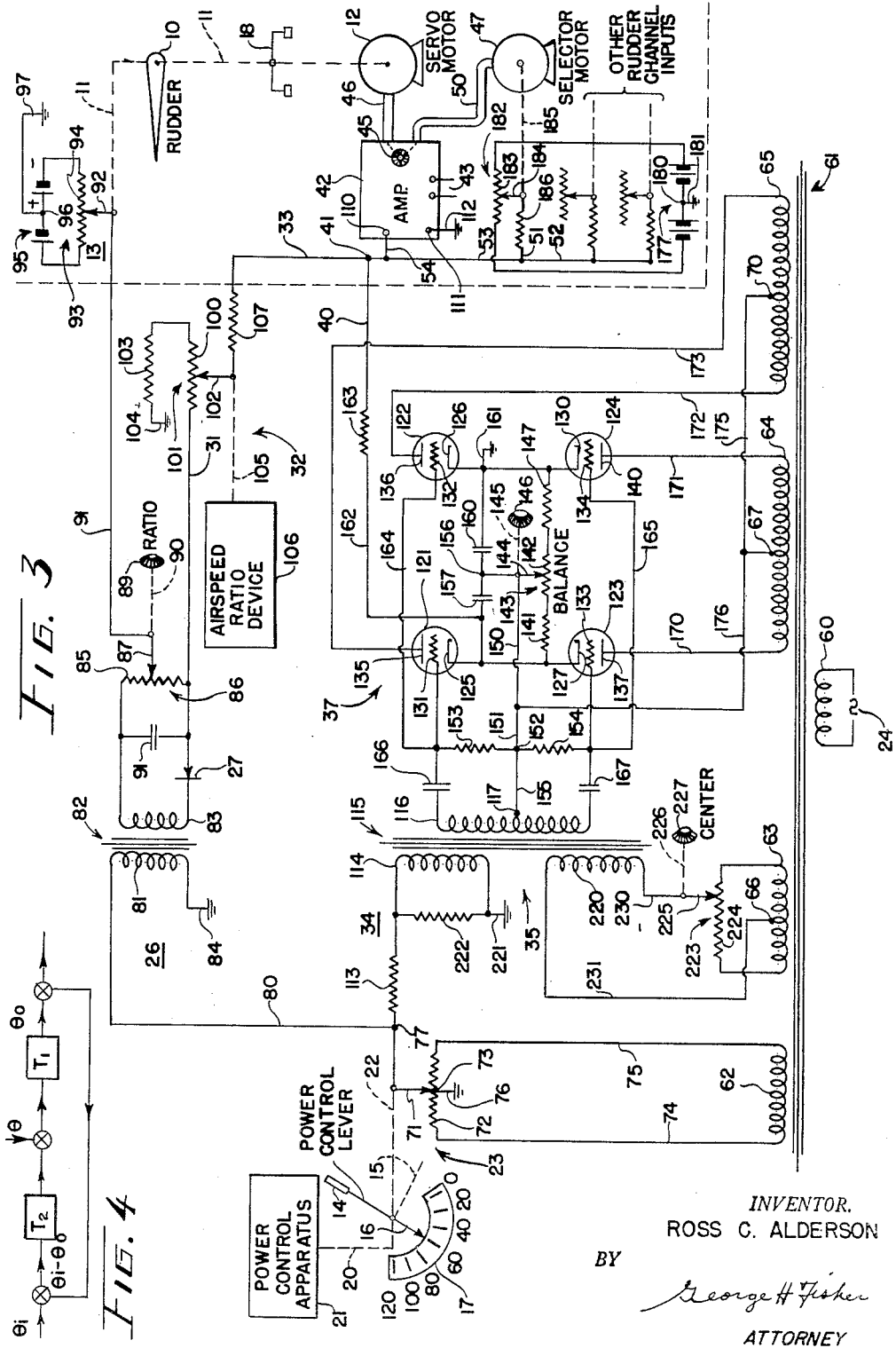

2,766,952
AIRCRAFT CONTROL APPARATUS

Ross C. Alderson, St. Louis Park, Minn., assignor to Minneapolis-Honeywell Regulator Company, Minneapolis, Minn., a corporation of Delaware Application December 1, 1951, Serial No. 259,407

13 Claims. (Cl. 244—77)

This invention relates to the field of aircraft control apparatus, and more particularly to means for automatically adjusting the position of the rudder of a single engine aircraft to compensate for changes in airspeed and power settings.

Automatic pilots for aircraft have been the subject in intensive development in recent years. The complexity of the problem and the natural course of advancement of such a technical art has heretofore required equipment of considerable bulk and weight. Such automatic pilots cannot be used with any degree of efficiency except in the larger craft, and the refinements in automatic pilot construction so far developed have hence been largely those pertaining to multi-engine craft.

With the advent of practical miniaturized components the construction of automatic pilots suitable for use in single engine craft has also become more practical, and specific requirements of such automatic pilots now require more consideration. A basic difference between single engine craft and larger craft lies in the fact that the empennage of the smaller craft lies in the slip stream from the propeller rather than in relatively undisturbed air. The wind relative to the horizontal stabilizer, elevators, vertical fin, and rudder varies in both intensity and direction as the craft's airspeed and engine speed change. The moment arms, about the craft's roll axis, of the wind forces on the empennage surfaces are relatively small and in practice roll displacement of the craft is negligible. The moment arm, about the craft's yaw axis, of the wind forces on the vertical empennage surfaces is considerable, however, and a very significant change in rudder setting is required to maintain a desired heading as the craft's power and airspeed are varied.

As long as there is a human pilot, his judgment may be relied upon to maintain the craft in the desired flight regardless of change in airspeed or power. Where an automatic pilot is contemplated, however, it is not enough simply to provide a rudder signal whenever the heading of the craft deviates from a standard, provided by a directional gyroscope, for example. A system of that type is satisfactory in craft having an even number of engines so that the slip stream does not flow over the rudder and therefore the effect of a given rudder position on the craft's attitude is the same for all engine speeds, but in single engine craft the rudder channel of an automatic pilot must include not only a standard of heading, but also inputs varying with airspeed and power, if change of heading as either of the latter variables changes is to be avoided.

An object of the invention is to provide means for automatically adjusting a control surface of a single engine aircraft to compensate for heading changes resulting from changes in airspeed and power.

Another object of the invention is to provide means normally adjusting a control surface of an aircraft to maintain a desired heading, together with means modifying the operation of the adjusting means in accordance with the airspeed and power setting of the craft.

Another object of the invention is to provide means normally controlling the rudder of an aircraft to maintain a desired heading, together with means modifying the operation of the controlling means in accordance with the power setting and the rudder position of the craft.

It is another object of the invention to provide means normally controlling the rudder of an aircraft to maintain a desired heading, together with means modifying the operation of the controlling means in accordance with the airspeed, power setting, and rudder position of the craft.

It is another object of the invention to provide means normally controlling the rudder of an aircraft to maintain a desired heading, together with means modifying the operation of the controlling means in accordance with the power setting and power setting deviation of the craft.

A further object of the invention is to provide means normally controlling the rudder of the aircraft to maintain a desired heading, together with means modifying the operation of the controlling means in accordance with the power setting deviation and rudder position of the aircraft.

A further object of the invention is to provide means as described above whose operation is still further modified in accordance with the airspeed of the craft.

A more specific object of the invention is to provide means normally controlling the rudder of an aircraft to maintain a desired heading together with means modifying the operation of the controlling means in accordance with the power setting of the craft.

A further specific object of the invention is to provide means normally controlling the rudder of an aircraft to maintain a desired heading, together with means modifying the operation of the controlling means in accordance with the power setting deviation of the craft.

Yet a further specific object of the invention is to provide, in apparatus of the class described above, a computer for solving equations of the type $$C_0 R = \frac{C_1 + C_2 f_1(P)}{f(V)} + C_3$$

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

Figure 3 is a detailed wiring diagram of the apparatus of Figure 1; and

Figure 4 is a simplified diagram of the apparatus as a servo system.

Figure 2:
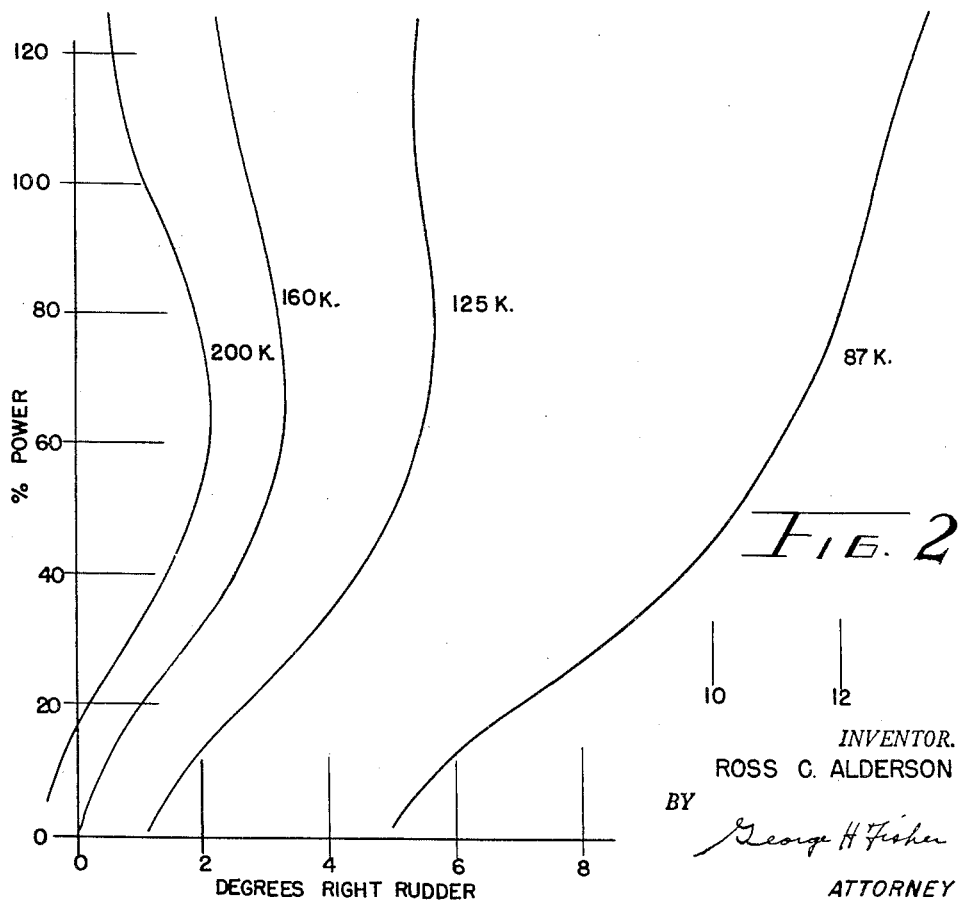
Figure 2 is a diagram illustrative of the relation between rudder displacement, required in a particular aircraft to maintain heading, and percent of rated power, for various airspeeds.

The curves presented in Figure 2 are representative of rudder-versus-power characteristics for single engine aircraft generally, although the data on which the curves are based were taken in an aircraft of a particular type. In that aircraft, right rudder displacement is necessary to counteract the tendency of the craft to yaw: Figure 2 is a plot of degrees of right rudder displacement required to maintain heading at various power settings, for each of four different airspeeds expressed in knots. It has been found that this family of curves can be approximated by the general equation $$C_0R = \frac{C_1 + C_2 \cdot f_1(P)}{f(V)} + C_3 f_2(P) \quad (1)$$

wherein R is amount of right rudder in degrees, P is actual power setting, and V is actual indicated airspeed. Further analysis leads to the following further information, $$f_1(P) = \frac{P}{P_r} \quad (2)$$

$$f_2(P) = \frac{P}{P_r} - .6 \quad (3)$$

$$f(V) = \frac{V^2}{V_a^2} \quad (4)$$

where $P_r$ is the normal rated power, and $V_a$ is a minimum indicated airspeed for the particular craft. Equation 1 may now be expanded to read $$C_0R = \frac{C_1 + C_2\left(\frac{P}{P_r}\right)}{\frac{V^2}{V_a^2}} + C_3\left(\frac{P}{P_r} - .6\right) \quad (5)$$

which may be arranged to read $$\frac{V^2}{V_a^2}\left[C_0R - C_3\left(\frac{P}{P_r} - .6\right)\right] - C_1 - C_2\frac{P}{P_r} = 0 \quad (6)$$

The structure of the present invention is designed to solve Equation 6 as will now be described.

Figure 1:
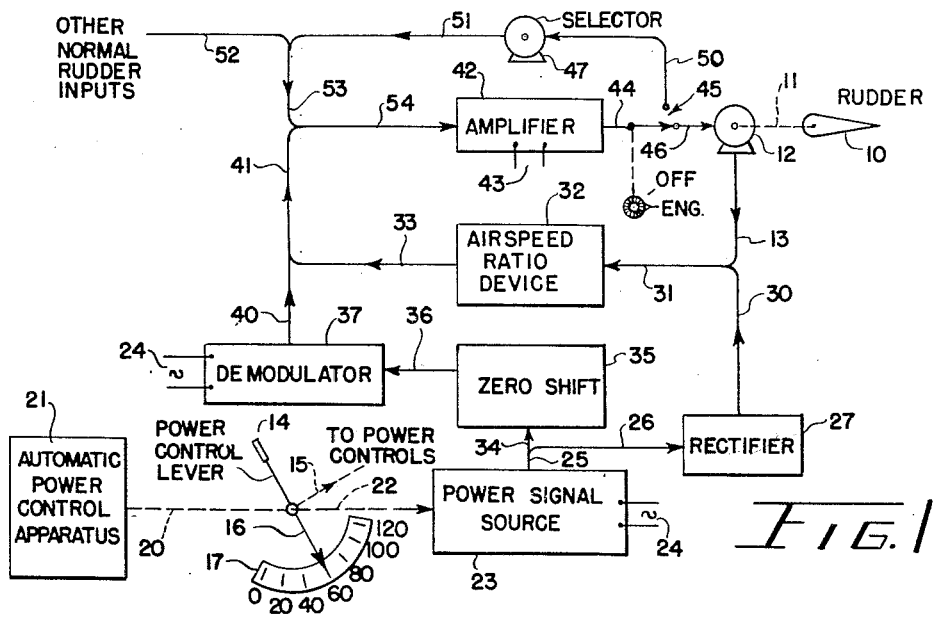
Figure 1 is a block diagram of apparatus for accomplishing the desired rudder control.

Referring first to Figure 1, the rudder of the craft is shown at 10 to be positioned through a mechanical connection 11 by a rudder servomotor 12. Connection 11 may include the usual clutching or manual override arrangement, and such braking arrangements and reduction gearing as may be desired. In addition to operating rudder 10, servomotor 12 also acts through conventional means to supply an output, indicated at 13, which is zero when the rudder is streamlined with respect to the airframe, and which is proportional according to a constant $C_0$ to the extent R of operation of the rudder from the streamline position. Output 13 thus has the value $C_0R$: it reverses in sense with reversal in the sense of the displacement of the rudder from the streamline position.

In the lower part of Figure 1, there is shown a manual lever 14 arranged to actuate the power controls of the craft, for example the throttle and propeller pitch governor, through a connection 15 which may be either mechanical or electrical. Lever 14 may carry an index 16 movable with respect to a fixed scale 17 of power expressed in percent of normal rated power $P_r$. The range of lever 14 is such that P may vary from a minimum value of 0 to a maximum value of 120 percent of $P_r$. Lever 14 is shown as arranged for actuation, through a mechanical connection 20, which may include override or disconnect means, reduction gearing, etc., from automatic power control apparatus indicated at 21. This apparatus may be any arrangement for automatically controlling the power of the craft in accordance with some condition, such for example as the attack angle of the craft. One suitable arrangement of this sort is disclosed in detail in my copending application Serial No. 206,578, filed January 18, 1951 and assigned to the assignee of the present invention. The details of apparatus 21 form no part of the present invention, and will not be duplicated here.

Mechanical connection 20 is extended at 22 to adjust the output of a power signal source 23, which is continuously energized with alternating voltage of a fixed phase and amplitude from a suitable source 24. The arrangement is such that when lever 14 is set at 60 percent of normal rated power, no output is supplied by source 23, while for lever settings on either side of the 60 percent point an output 25 comprising an alternating voltage of one or the other of two opposite phases is supplied by signal source 23. The amplitude of the output voltage is proportional to the displacement of lever 14 from the 60 percent point, that is, to $$\left(\frac{P}{P_r} - .6\right)$$

the constant of proportionality $C_3$ is determined by the voltage of source 24.

Output 25 is supplied through a suitable connection 26 to a rectifier 27, and the output 30 of rectifier 27 is combined with output 13 from rudder servomotor 12 to comprise an input signal 31 of value $$C_3\left(\frac{P}{P_r} - .6\right) - C_0R$$

to a dynamic air pressure controlled device 32. The function of device 32 is to modify input 31 in accordance with the ratio $$\frac{V^2}{V_a^2}$$

between the square of the craft's actual indicated airspeed and the square of a selected minimum indicated airspeed, to give a modified output 33 having a value $$\frac{V^2}{V_a^2}\left[C_0R - C_3\left(\frac{P}{P_r} - .6\right)\right]$$

Output 25 is also supplied through a connection 34 to a zero shifting device 35, which functions to convert the phase reversing output from source 23 to an output 36 which varies from zero to a maximum value of one phase as signal source 23 is adjusted through its full range. This is done by combining with a signal proportional to $$\left(\frac{P}{P_r} - .6\right)$$

a second signal proportional on the same scale to $+.6$: the result is obviously proportional to $$\frac{P}{P_r}$$

on the same scale. The second constant of proportionality may be given the symbol $C_2$ so that the actual value of output 36 may be written $$C_2\frac{P}{P_r}$$

Output 36 is supplied to a demodulator 37 which is also energized with alternating voltage from source 24, and the output 40 from demodulator 37 is combined with output 33 from dynamic air pressure responsive device 32 to provide a first input 41 for a motor control amplifier 42 having a value $$\frac{V^2}{V_a^2}\left[C_0R - C_3\left(\frac{P}{P_r} - .6\right)\right] - C_2\frac{P}{P_r}$$

Amplifier 42 operates to control the supply of electrical energy from a source 43 to provide an output 44 which is suitable to cause forward or reverse operation of a direct current motor connected thereto, in accordance with the polarity of the input signal applied to the amplifier. Switching means 45 are provided for distributing this output voltage either to rudder servomotor 12, through a connection 46, or to a selector motor 47 through a connection 50. Selector motor 47 operates a conventional signal producing device to supply an output 51 whose sense and magnitude are determined by the direction and amount of displacement of the selector motor shaft from an arbitrary position. This output has the value $C_1$.

In the ordinary rudder control portion of an automatic pilot, there are a number of units supplying control signals, and this fact is suggested by input 52 which is shown as combining with output 51 to comprise a further input 53 for amplifier 42, the final input to which is identified by the reference numeral 54. The other normal rudder inputs represented by reference numeral 52, however, are not significant in the present case because they represent signals related to dynamic characteristics of the aircraft about its yaw axis, and in the long run have a resultant zero value. The present invention is related not to dynamic characteristics but to steady state conditions. Input 53 may therefore be said to have the value $C_1$, and input 51 accordingly has the value $$\frac{V^2}{V_a^2}\left[C_0R - C_3\left(\frac{P}{P_r} - .6\right)\right] - C_1 - C_2\frac{P}{P_r}$$

As long as this value is not equal to zero, either motor 12 or motor 47 runs depending on the position of switch 45, adjusting R or $C_1$ respectively until the zero value is achieved.

Reference should now be made to Figure 3, which gives details of the elements shown generally in Figure 2. Alternating voltage source 24 is shown as energizing the primary winding 60 of a transformer 61 having a plurality of secondary windings 62, 63, 64, and 65, the latter three windings being center tapped at 66, 67, and 70, respectively.

Power signal source 23 is shown in Figure 3 to comprise a voltage divider having a slider 71 and a winding 72 center tapped at 73. Winding 72 is energized from secondary winding 62 of transformer 61 through conductors 74 and 75. Center tap 73 is grounded at 76.

The output 25 of signal source 23 shown in Figure 2 appears at a terminal 77 in Figure 3, and connection 26 of Figure 2 is shown in Figure 3 to comprise a conductor 80 and the primary winding 81 of a transformer 82 having a secondary winding 83. This circuit is completed through ground connection 76 and a second ground connection 84 connected to primary winding 81. The secondary circuit for transformer 82 includes rectifier 27 and the winding 85 of a voltage divider 86 having a slider 87 adjustable through a manual knob 90. A filter capacitor 91 is connected across winding 85 to suppress the alternating component of the rectified current flowing in the winding.

Slider 87 is connected through a conductor 91 to the slider 92 of a voltage divider 93 having a winding 94 energized from a source 95 of unidirectional voltage center tapped at 96: center tap 96 is grounded as shown at 97.

The lower terminal of winding 85 is connected by a conductor 31 to a series circuit including the winding 100 of a voltage divider 101, having a slider 102, and a fixed resistor 103, the circuit being completed through a ground connection 104. Slider 102 is actuated through a mechanical connection 105 from an airspeed responsive device 106, and is connected through a summing resistor 107 and conductors 33, 41, and 54 to one input terminal 110 of amplifier 42: the other input terminal 111 of amplifier 42 is grounded at 112.

It will be apparent from the study of the circuit that the potential of conductor 31 with respect to ground is the sum of two voltages, one being determined by the displacement of slider 92 from the center of winding 94, and the other being determined in part by the displacement of slider 87 from the lower terminal of winding 85, and in part by the voltage impressed on primary winding 81 of transformer 82. The first of these voltages is proportional to R, the rudder displacement, the constant of proportionality $C_0$ being determined by the voltage of source 95. The second of these voltages is proportional to $$\left(\frac{P}{P_r} - .6\right)$$

the constant of proportionality $C_3$ being determined by the output of winding 62, the turns ratio in transformer 82, and the position of slider 87. The latter may be adjusted by manipulation of ratio knob 89 to compensate for manufacturing tolerances in the components making up the circuit.

The voltage between conductor 31 and ground therefore is equal to the second factor of the first term of Equation 6, and of this voltage a portion determined by the position of slider 102 is taken in voltage divider 101. The voltage between slider 102 and ground is accordingly equal to the first term in Equation 6

$$\frac{V^2}{V_a^2}\left[C_0R - C_3\left(\frac{P}{P_r} - .6\right)\right]$$

Terminal 77 is also connected to a voltage divider comprising resistor 113 and resistor 222. The voltage drop across resistor 222 is supplied to one primary winding 114 of a transformer 115 having a secondary winding 116 center tapped at 117 and a second primary winding 220. The terminals of primary winding 114 and resistor 222 remote from resistor 113 are grounded at 221. Primary winding 220 is energized from secondary winding 63 of transformer 61 under control of a voltage divider 223 having a winding 224 and a slider 225 actuated through a mechanical connection 226 by a manual centering knob 227. The primary winding 220 is connected by conductors 230 and 231 between slider 225 of voltage divider 223 and center tap 66 on winding 63.

Secondary winding 116 of transformer 115 energizes demodulator 37, which is shown to comprise a plurality of triodes 121, 122, 123, and 124, comprising respectively cathodes 125, 126, 127, and 130, grids 131, 132, 133, and 134, and anodes 135, 136, 137, and 140.

Cathodes 125 and 127 are connected together, as are cathodes 126 and 130. The two cathode circuits are joined by a further circuit including a fixed resistor 141, the winding 142 of a voltage divider 143 having a slider 144 actuated through a mechanical connection 145 by a balancing knob 146, and a second fixed resistor 147. Slider 144 is connected through conductors 150 and 151 to the common terminal 152 between a pair of grid resistors 153 and 154, and through a further conductor 155 to center tap 117 of winding 116. Slider 144 is also connected to the common terminal 156 between a pair of filter capacitors 157 and 160. The free terminal of capacitor 160 is connected to cathodes 126 and 130, and also to a ground connection 161. The free terminal of capacitor 157 is connected to cathodes 125 and 127, and also, through a conductor 162, to a summing resistor 163. Grids 131 and 132 are joined by a conductor 164, and grids 133 and 134 are joined by a conductor 165. The secondary voltage of transformer 115 is applied to the grids of the modulator through blocking condensers 166 and 167.

In addition to the signal voltage supplied to the modulator through transformer 115, alternating voltage is supplied to the plates of the modulator circuit through windings 64 and 65 of transformer 61. Thus anodes 137 and 140 are connected to the terminals of secondary winding 64 by conductors 170 and 171, and anodes 136 and 135 are energized from secondary winding 65 through conductors 172 and 173, all respectively. Center taps 70 and 67 are connected to slider 144 through conductors 175, 176, and 150. Summing resistor 163 is connected to input terminal 110 of amplifier 42 by conductors 40, 41, and 54. In operation demodulator 37 supplies between conductor 162 and ground a unidirectional voltage whose polarity and magnitude are determined by the phase and amplitude of the alternating voltage supplied by secondary winding 116.

The current in winding 114 is proportional to $$\left(\frac{P}{P_r} - .6\right)$$

the constant of proportionality $C_2$ being determined by the voltage supplied by secondary winding 62 and by the ratio of the resistances of resistors 113 and 222. The current in winding 220 is proportional to .6, the constant of proportionality being made equal to $C_2$ by setting of slider 225. The turns ratio in transformer 115 is selected so that the voltage between conductor 162 and ground is equal in magnitude to the R. M. S. value of the output of secondary winding 116, and thus has the value $$C_2 \frac{P}{P_r}$$

In the lower right hand portion of Figure 3 there is shown a further source 177 of unidirectional voltage having a center tap 180 grounded at 181. Source 177 energizes the windings of a number of voltage dividers including a voltage divider 182 having a winding 183 and a slider 184 actuated through a mechanical connection 185 by selector motor 47. The voltage of slider 184 has the value $C_1$. Slider 184 is connected through a summing resistor 186 and conductors 51, 53, and 54 to input terminal 110 of amplifier 42. A plurality of further voltage dividers are shown in this portion of the drawing to indicate such other normal rudder inputs as are desired by the designer for transient control of the craft's heading such for example as an input from the directional gyroscope of the aircraft.

The normal rudder pedals for controlling the heading of the aircraft in the absence of any automatic pilot are indicated by reference numeral 18.

In one operative embodiment of the invention the following values were found satisfactory:

Source:
 24 _____ R. M. S. 115 V. 400 cycle 1 phase A. C.
 43 _____ Unregulated 28 volts D. C.
 95 _____ Regulated 40 volts D. C. center tapped.
 177 _____ Regulated 10 volts D. C. center tapped.
Capacitors:
 166 and 167 ____ .01 mfd.
 157 and 160 ____ 250 mfd.
 91 _____ 100 mfd.
Resistor:
 103 _____ 150 ohms.
 186, 107, 153,
  154, 163 _____ 1 megohm.
 222, 141, 147 __ 3,000 ohms.
 113 _____ 8,200 ohms.
Voltage divider:
 23 _____ 1,500 ohms.
 86 _____ 2,000 ohms.
 93.
 101 _____ 5,400 ohms.
 223 _____ 5,000 ohms.
 143 _____ 1,000 ohms.
 182 _____ 1,800 ohms.
Transformer 61:
 Secondary 62 __ R. M. S. 36 volts.
 Secondary 63 __ R. M. S. 10 volts center tapped.
 Secondaries 64
  and 65 _____ R. M. S. 550 volts center tapped.
Transformer 82:
 Ratio 81 : 83 ___ 1 : 1.
Transformer 115:
 Ratio 114 : ½ of
  116 _____ 1 : 2.3.
 Ratio 220 : ½ of
  116 _____ 1 : 2.3.
Triodes:
 121 and 123 ___ 12AU7.
 122 and 124 ___ 12AU7.
Rudder travel _____ ±30°.

Operation

As previously pointed out, slider 71 is at center tap 73 when index 16 is at 60 on scale 17, and when the power supplied by the engines is 60% of normal rated power. Slider 71 is at the left end of winding 72 when the power is 120% of normal, and at the right end of winding 72 when the power is zero. Mechanical connection 11 is such that when rudder 10 is streamlined, slider 92 is at the center of winding 94, and that when rudder 10 is moved through its range of ±30°, slider 92 moves from one end of winding 94 to the other.

Mechanical connection 105 is adjusted so that for a specific low airspeed, say 65 knots, slider 102 is at the right hand end of winding 100, and as the airspeed increases to six times the low value, or 390 knots, slider 102 is displaced to the left hand end of winding 100.

Slider 144 is set so that, with transformer 61 energized but with primary windings 114 and 220 of transformer 115 temporarily disconnected, no unidirectional voltage of either polarity appears between conductor 162 and ground: windings 114 and 220 are then reconnected.

Lever 14 is next set to its zero position, and slider 225 is adjusted by knob 227 until the secondary voltage from transformer 115 is just reduced to zero.

The foregoing adjustments can be made on the ground, with source 43 deenergized. The remaining adjustments must be made in flight. Switch 45 is thrown so as to disconnect servomotor 12 from amplifier 42, and to connect motor 47 to the amplifier. The craft is brought onto a desired heading, and given a desired power setting, by the human pilot. Source 43 is now energized.

Inasmuch as the heading of the craft has become stable, no voltages are applied to terminal 110 of amplifier 42 through connection 52. A first unidirectional voltage dependent upon the direction and amount of the displacement of slider 184 from the center of winding 183 is applied to terminal 110 through summing resistor 186, and second and third unidirectional voltages are applied to the terminal through summing resistors 163 and 107.

The first unidirectional voltage has a random value, since slider 184 is at a random position on winding 183 determined by the previous operation of motor 47.

The second unidirectional voltage is determined by the position of slider 71. The voltage across primary winding 114 is proportional to the displacement of slider 71 from the 60% point, the constant proportionality being determined by the resistances of resistors 113 and 222. The effect of winding 220 is to add to that voltage a constant voltage equal to one-half the output from secondary 62. Thus except when slider 71 is at its zero point, an input is supplied to demodulator 37. The demodulator supplies an output at summing resistor 163 which is always of one polarity, and which is proportional in magnitude to the actual percentage of power, $$\frac{P}{P_r}$$

The third unidirectional voltage is determined by the position of slider 71, the position of the rudder of the craft, the craft's airspeed, and the position of slider 87. The primary voltage on transformer 82 is determined in phase and amplitude by the sense and amount of the displacement of slider 71, that is, it is proportional to $$\left(\frac{P}{P_r} - .6\right)$$

and the unidirectional voltage drop in any portion of winding 87 is in the same proportion. The voltage between slider 92 and ground is proportional to the angular displacement of the rudder from a streamlined position. By adjusting slider 87 the relative magnitudes of these two voltages can be varied, and of their sum a variable portion, determined by the position of slider 102 and hence by the airspeed of the craft, appears at summing resistor 107.

From the above it will be apparent that in Equation 6 above R is determined by the position of slider 92, $$\left(\frac{P}{P_r} - .6\right)$$

is determined by the position of slider 71, and the voltage between conductor 31 and ground is equal to $$C_0 R - C_3 \left(\frac{P}{P_r} - .6\right)$$

The position of slider 102 is proportional to $$\frac{V^2}{V_a^2}$$

so that the voltage supplied through summing resistor 107 is equal to $$\left(\frac{V^2}{V_a^2}\right)\left[C_0 R - C_3\left(\frac{P}{P_r} - .6\right)\right]$$

where the constants are determined by the voltage supplied by source 95 and secondary winding 62, the turns ratio of transformer 82, the setting of slider 87, and the magnitude of summing resistor 107.

A voltage equal to $$C_2\left(\frac{P}{P_r}\right)$$

is supplied through summing resistor 163, the constant being determined, neglecting losses, by the voltage supplied by secondary winding 62, the values of resistors 113 and 222, the turns ratio of transformer 115, and the magnitude of summing resistor 163.

The voltage supplied through summing resistor 186 is to represent $C_1$ in Equation 6, and is variable by motor 47 in accordance with the input to amplifier 42. If slider 184 does not happen to be set so that the voltage supplied through summing resistor 186 is equal and opposite to the sum of the voltages supplied through summing resistors 107 and 163, an input is supplied to amplifier 42 and motor 47 is energized, adjusting slider 184 until it supplies such a voltage that Equation 6 is satisfied. Operation of motor 47 then stops. Thus motor 47 and potentiometer 182 function to calibrate the apparatus for any initial condition selected by the human pilot. Switch 45 may now be operated to disconnect motor 47 from amplifier 42 and to connect motor 12 thereto. Slider 184 is now fixed in position, supplying a voltage equal to $C_1$.

As long as neither the airspeed nor the power setting of the craft changes, the system remains in this condition. If any of the usual rudder signals changes, a voltage is supplied along conductor 53 to amplifier 42, and motor 12 is energized to displace slider 92 until the new voltage supplied through summing resistor 107 is equal and opposite to the voltage supplied through conductor 52. The concurrent change in rudder position results in correction of the heading of the craft, and a stable condition is finally reached when the craft has regained its original heading, and the rudder is once again in its former condition.

If the airspeed of the craft changes, due for example to a change in pitch attitude, slider 102 is displaced along winding 100, changing the voltage supplied through summing resistor 107, an input is thus supplied to amplifier 42, and motor 12 is energized, adjusting the rudder of the craft and positioning slider 92 to change the total voltage across winding 100 and resistor 103. When this voltage has changed sufficiently to bring the voltage at slider 102 back to its former value, the signal at amplifier 42 is once more reduced to zero, and motor 12 again stops. The change in rudder position thus accomplished maintains the heading and eliminates yaw of the craft regardless of the changed airspeed.

If power control 14 is adjusted, with accompanying adjustment in the position of slider 71, the voltages supplied through summing resistors 163 and 107 are both changed, and an input is once more supplied to amplifier 42. Motor 12 is energized, positioning rudder 10 and simultaneously adjusting slider 92 until the resulting change in voltage supplied through summing resistor 107 is enough not only to make up for the change in voltage between slider 87 and conductor 31, but also to make up for the change in voltage supplied through summing resistor 163 as well. When this has occurred, amplifier 42 is once again deenergized, motor 12 stops, and rudder 10 is in a new position in which the heading of the craft is maintained regardless of the changed power setting.

To those familiar with the principles of aerodynamics it will be apparent that the same effective control of heading may be exercised by ailerons rather than by rudder, if flight in a slightly rolled attitude can be tolerated.

It must be pointed out that in addition to improved aircraft control means the present invention comprises as a subcomponent an inventive improvement in computers of the servomotor type. This is best shown in Figure 4, where two circuits having transfer functions $T_1$ and $T_2$ are connected so that the latter energizes the former, and so that a feed-back from the former energizes the latter. Further inputs $\theta$ and $\theta_1$ are supplied to the two circuits respectively. If $\theta_0$ is the output from the system, it is clear that $$\theta_0 = T_1[\theta + T_2(\theta_i - \theta_0)] \quad (7)$$
$$\theta_0 = T_1\theta + T_1T_2\theta_i - T_1T_2\theta_0$$
$$\theta_0(1 + T_1T_2) = T_1T_2\theta_i + T_1\theta$$

$$\theta_0 = \frac{T_1T_2}{1+T_1T_2}\theta_i + \frac{T_1}{1+T_1T_2}\theta \quad (8)$$

The transfer functions $T_1$ and $T_2$ are so chosen that the magnitude of their product is large compared to unity, so that $$\frac{T_1T_2}{1+T_1T_2} = 1 \quad (9)$$

from whence it may be computed that $$\frac{T_1}{1+T_1T_2} = \frac{1}{T_2} \quad (10)$$

Equation 8 now becomes $$\theta_0 = \theta_i + \frac{1}{T_2}\theta \quad (11)$$

Equation 5 is of the same form as Equation 11—this can easily be shown by letting $C_0R = \theta_0$, $$C_3\left(\frac{P}{P_r} - .6\right) = \theta_1$$

$$C_1 + C_2\left(\frac{P}{P_r}\right) = \theta$$

and $$\frac{V^2}{V_a^2} = T_2$$

The circuit of Figure 3 therefore has the characteristics of the servo system of Figure 4.

The advantage of this form of computer over simpler arrangements lies in the fact that by its use two different functions of a single variable may be added. Thus let $$\theta_i = \theta = f(x)$$

Then Equation 11 becomes $$\theta_0 = f(x) + \frac{f(x)}{T_2} \quad (12)$$

By selection of a suitably non-linear transfer function $T_2$ it is possible to compute the sum of a linear and a non-linear function of $x$, using only a single linear pickup for $x$. Equation 5 may be shown to be of the same form as Equation 12 by letting $C_0R = \theta_0$ $$C_3\left(\frac{P}{P_r} - .6\right) = f(x)$$

and $$\left[-\frac{C_3/C_2}{V^2/V_a^2} - \frac{C_3(C+.6)}{C_2}\right] = \frac{1}{T_2}$$

As a reciprocal exponential it is obvious that $$\frac{1}{T_2}$$

is not linear, and hence $$\frac{f(x)}{T_2}$$

is non-linear even though $f(x)$ itself is linear. Thus by a single setting of a slider 71 on linear winding 72 it is possible to determine the sum of linear and non-linear functions of $$\frac{P}{P_r}$$

From the foregoing description it will now be apparent that I have invented a new arrangement for automatically modifying the position of the rudder of a dirigible craft in accordance with its airspeed and power settings, to maintain the heading of the craft regardless of change in these variables, and that as an incident thereto I have invented a new computing apparatus for solving equations having more than one function of a variable while requiring only a single pickup member in response to the variable.

Numerous objects and advantages of my invention have been set forth in the foregoing description, together with details of the structure and function of the invention, and the novel features are pointed out in the appended claims. The disclosure however is illustrative only, and I may make changes in detail within the principle of the invention to the full extent indicated by the broad general meaning of the terms in which the appended claims are expressed.

I claim as my invention:

1. Apparatus of the class described comprising, in combination: means operable to normally control the position of the rudder of a dirigible craft; means adjustable to give an output in accordance with the airspeed of the craft; means adjustable to give an output determined by a power setting of the craft; and means interconnecting the above named means for modifying the operation of said position determining means in accordance with said outputs.

2. Apparatus of the class described comprising, in combination: means for giving an output determined by the displacement of the rudder of a dirigible craft from a selected position; means adjustable to give an output determined by the setting of a power control of the craft; means connected to the above named means for combining said outputs to comprise a signal; means connected to said combining means for modifying said signal in accordance with the airspeed of the craft; means operable to normally position the rudder of the craft so as to stabilize a condition of movement of the craft; and means connecting said modifying means to said last named means for modifying the operation of said last named means in accordance with said signal.

3. Apparatus of the class described comprising, in combination: means for giving an output determined by the setting of the power control of a dirigible craft; means giving an output which is adjustable within a range of values at least half as large as the range of output of said first named means; further means connected to both said means for combining said outputs in opposition to give a signal which varies in accordance with the departure of said setting from a selected value; means for normally adjusting the rudder of the craft to maintain a desired condition of movement; and means connected to both said further means and said last named means for modifying the operation of said last named means in accordance with said signal.

4. Apparatus of the class described comprising, in combination: means for normally adjusting the rudder of a dirigible craft to maintain a desired condition of movement; control means for giving a first output in accordance with the setting of a power control of the craft; first signal means giving a first signal in accordance with the departure of said setting from a selected value; control means for giving a second output in accordance with displacement of the rudder of the craft from a selected position; second signal means connected to both said control means for combining said first and second outputs to comprise a second signal; means connected to said last named means for modifying said second signal in accordance with the airspeed of the craft; and means connected to said first signal means and said modifying means for modifying the operation of said adjusting means in accordance with said first signal and said modified signal.

5. Apparatus of the class described comprising, in combination: means for normally adjusting the rudder of a dirigible craft to maintain a desired condition of movement; means for giving outputs in accordance with the setting of a power control of the craft and with the departure of said setting from a selected value; and means interconnecting said above named means for modifying the operation of said adjusting means in accordance with said outputs.

6. Apparatus of the class described comprising, in combination: means for normally adjusting the rudder of a dirigible craft to maintain a desired condition of movement; means for giving outputs in accordance with the setting of a power control of the craft and with the departure of said setting from a selected value; means connected to said second named means for modifying one of said outputs in accordance with the airspeed of the craft; and means connected to said first and last named means for modifying the operation of said adjusting means in accordance with said modified and unmodified outputs.

7. Apparatus of the class described comprising, in combination: means for normally adjusting the rudder of a dirigible craft to maintain a desired condition of movement; first control means for giving a first output in accordance with the setting of a power control of the craft, and a second output in accordance with departure of said setting from a selected value; second control means for giving a third output in accordance with displacement of the rudder of the craft from a selected position; means connected to both said control means for combining said first and third outputs to comprise a signal; further means connected to said last named means for modifying said signal in accordance with the airspeed of the craft; and means connected to said first control means, said further means, and said adjusting means for modifying the operation of said adjusting means in accordance with said signal and said first output.

8. Means for solving an equation of the type having linear and non-linear functions of a single variable, comprising, in combination: a servomotor to be operated in accordance with the value of the equation; a first network having a transfer function which is the reciprocal of a given non-linear function of the variable; a second network; means interconnecting said first network and said servomotor for energizing said first network in accordance with the operation of said servomotor; means interconnecting said networks for energizing said second network in accordance with the output of said first network; means connecting said second network to said servomotor for energizing said servomotor in accordance with the output of said second network; and means connected to said networks for further energizing each of said networks according to a linear function of said variable.

9. Apparatus for controlling the rudder of a dirigible craft in accordance with the value of an equation having a first term which varies with a power setting of the craft and a second term which varies with said power setting and with the airspeed of the craft, comprising, in combination: a rudder servomotor to be operated in accordance with said value of said equation; a network having a transfer function which is the reciprocal of said airspeed; an amplifier; means connecting said servomotor to said network for energizing said network in accordance with operation of said servomotor; means connecting said network to said amplifier for energizing said amplifier in accordance with the output of said network; means connecting said amplifier to said servomotor for energizing said servomotor in accordance with the output of said amplifier; and means connected to said network and said amplifier for further energizing said network and said amplifier according to functions of said power setting.

10. Apparatus for stabilizing the heading of an aircraft subject to rotational forces about its yaw axis which vary with power and airspeed, comprising, in combination: a control surface adjustable to apply a variable rotational force about the yaw axis of the craft; means connected to said control surface for normally adjusting said control surface to stabilize the attitude of the craft about its yaw axis; means connected to said adjusting means for modifying the operation thereof in accordance with the power setting of the craft; and independent means connected to said adjusting means for simultaneously modifying the operation thereof in accordance with the airspeed of the craft.

11. Apparatus of the class described comprising, in combination: a propeller driven aircraft having an empennage, including a control surface, and an engine mounted so that the slip stream from the propeller thereof flows over the empennage of the craft; first control means for giving a first output which varies as a function of airspeed; second control means giving a second output which varies as a function of power setting; means connected to said control surface for positioning the control surface in accordance with a signal; and means connected to said last named means and said control means for supplying a signal to said last named means which varies as a function of said outputs.

12. Apparatus of the class described comprising, in combination: means operable to normally control the adjustment of the heading control means of a dirigible craft; means adjustable to give an output in accordance with the airspeed of the craft; means adjustable to give an output determined by a power setting of the craft; and means interconnecting the above named means for modifying the operation of said first named means in accordance with said outputs.

13. Apparatus of the class described comprising, in combination: means operable to normally adjust the heading control means of a dirigible craft in accordance with the algebraic sum of a plurality of control signals; means adjustable to give an output determined by a power setting of the craft; and means interconnecting the above named means for modifying the operation of said first named means in accordance with said output.

References Cited in the file of this patent

UNITED STATES PATENTS

| | | |
|---|---|---|
| 2,104,627 | Von Manteuffel | Jan. 4, 1938 |
| 2,162,862 | Protzen | June 20, 1939 |
| 2,188,834 | Fischel et al. | Jan. 30, 1940 |
| 2,387,795 | Isserstedt | Mar. 26, 1943 |
| 2,391,896 | Hanson | Jan. 1, 1946 |
| 2,439,891 | Hornfeck | Apr. 20, 1948 |
| 2,525,038 | Kutzler | Oct. 10, 1950 |
| 2,545,343 | Conviser | Mar. 13, 1951 |
| 2,551,964 | Norton | May 8, 1951 |
| 2,587,193 | Miller | Feb. 26, 1952 |